(12) United States Patent
Kirihara et al.

(10) Patent No.: US 8,074,237 B2
(45) Date of Patent: Dec. 6, 2011

(54) OPTICAL DISK DEVICE INCLUDING BUFFER MECHANISM FOR BUFFERING ELASTIC DEFORMATION OF THE OPTICAL PICKUP SIDE OF A DISK MOTOR PLATE

(75) Inventors: Sojiro Kirihara, Kawasaki (JP); Yoshiaki Yamauchi, Omitama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 1004 days.

(21) Appl. No.: 11/840,251

(22) Filed: Aug. 17, 2007

(65) Prior Publication Data

US 2008/0244626 A1 Oct. 2, 2008

(30) Foreign Application Priority Data

Nov. 14, 2006 (JP) ................. 2006-308354

(51) Int. Cl.
- *G11B 17/03* (2006.01)
- *G11B 17/028* (2006.01)
- *G11B 19/20* (2006.01)

(52) U.S. Cl. ........................................ 720/697; 720/698

(58) Field of Classification Search ........... 720/695–698
See application file for complete search history.

(56) References Cited

U.S. PATENT DOCUMENTS

2003/0112734 A1* 6/2003 Shishido et al. .............. 369/263

FOREIGN PATENT DOCUMENTS

JP 2003-281876 10/2003

* cited by examiner

*Primary Examiner* — Craig A. Renner
*Assistant Examiner* — Gustavo Polo
(74) *Attorney, Agent, or Firm* — Antonelli, Terry, Stout & Kraus, LLP.

(57) ABSTRACT

An optical disk device includes: a disk motor for rotating an optical disk D inserted into a package; an optical pickup that moves in a radial direction of the optical disk, for controlling recording information on the optical disk or reading information from the optical disk; a chassis that is a base for supporting the disk motor and the optical pickup to chuck the optical disk directly inserted into the package to the disk motor; a motor plate that secures the disk motor to the base and that has one side, where the optical pickup is not located, supported by the base and the other side overhanging; and a raised portion for buffering elastic deformation of the optical pickup side of the disk motor plate.

5 Claims, 10 Drawing Sheets

CROSS-SECTIONAL VIEW TAKEN ALONG LINE A-A

CROSS-SECTIONAL VIEW TAKEN ALONG LINE B-B

OPTICAL DISK DEVICE INCLUDING BUFFER MECHANISM FOR BUFFERING ELASTIC DEFORMATION OF THE OPTICAL PICKUP SIDE OF A DISK MOTOR PLATE

CROSS-REFERENCES TO RELATED APPLICATIONS

This application relates to and claims priority from Japanese Patent Application No. 2006-308354, filed on Nov. 14, 2006, the entire disclosure of which is incorporated herein by reference.

BACKGROUND

1. Field of the Invention

The present invention relates to an optical disk device.

2. Description of Related Art

An optical disk device includes: a disk motor for rotating an optical disk; an optical pickup for controlling the recording of information on the optical disk or reading of information from the optical disk; and a mechanism called a "unit mechanical deck" for supporting the disk motor and chucking the optical disk to the disk motor.

This unit mechanical deck includes: a chassis; and an elevating mechanism for chucking the optical disk to the disk motor or elevating the chassis to release the (chucked) optical disk. When the optical disk is inserted into the optical disk device, the chassis elevating mechanism pushes up the chassis toward the optical disk and chucks the optical disk to dampers of the disk motor, thereby enabling data reproduction or recording on the optical disk.

There are two types of systems for carrying an optical disk to a unit mechanical deck: a disk-tray system and a slot-in system. The former system is of the type involving putting an optical disk on a disk tray and inserting the entire disk tray with the optical disk on it into a disk package. The latter system is of the type directly involving inserting an optical disk into an optical disk device without using a disk tray. Optical disk devices of the slot-in system are adopted for equipment in which a thin body is ideal.

Measures against impact are provided in this type of optical disk device. For example, as disclosed in Japanese Patent Laid-Open (Kokai) Publication No. 2003-281876, there is an optical disk device that has a disk-tray system configured so that a first stopper and a second stopper protruding from the lower surface of a chassis, on which an optical disk rotation drive unit is mounted, are made to come into contact with a bottom plate when the optical disk rotation drive unit is at a lowered position, thereby preventing the chassis from interfering with or colliding with other components when a disk tray is ejected.

SUMMARY

In an optical disk device, a disk motor is secured to a disk motor plate, and this disk motor plate is secured to a chassis for a unit mechanical deck. When securing the disk motor plate to the chassis, a cantilever support structure is employed in which one side of the disk motor plate where the optical pickup is not placed is secured to the chassis.

However, such a cantilever support structure does not have sufficient rigidity to secure the disk motor to the chassis. Also, as the demand for thinner equipment such as notebook computers grows, the unit mechanical decks are made thinner; and as an unavoidable result, the rigidity of the unit mechanical deck to which the disk motor plate is secured is reduced.

Given the above-described circumstances, should the optical disk device undergoes some kind of strong impact, for example, from falling down, an impact moment is produced on the disk motor plate, mainly around the cantilever support portion, and there is a possibility that the disk motor plate may fail to withstand the impact and become elastically deformed and then eventually plastically deformed. As a result, the problem of a worsened degree of parallelism of the disk motor with the optical pickup, which causes failures in data reproduction or recording on the optical disk, may arise.

The aforementioned example of the conventional optical disk device is designed to deal with the problem of the chassis interfering with or colliding with other components when the disk tray is ejected, and no consideration is given to suppressing deformation of the disk motor plate.

In order to solve the problem described above, it is an object of the present invention to provide an optical disk device with a disk motor plate having enhanced impact resistance.

In order to achieve the above-described object, according to an aspect of the invention, an optical disk device for reproducing data or reproducing and recording data on an optical disk is provided, wherein the optical disk device includes: a package to insert the optical disk; a disk motor for rotating the optical disk inserted in the package; an optical pickup for controlling recording information on the optical disk or reading information from the optical disk, that moves in a radial direction of the optical disk; a base for supporting the disk motor to chuck the optical disk inserted into the package to the disk motor; a disk motor plate for securing the disk motor to the base; and a buffer mechanism located in a projection plane of the disk motor on the bottom face of the package, for buffering elastic deformation of the disk motor plate.

DETAILED DESCRIPTION OF PREFERRED EMBODIMENTS

First Embodiment

Figure 1:
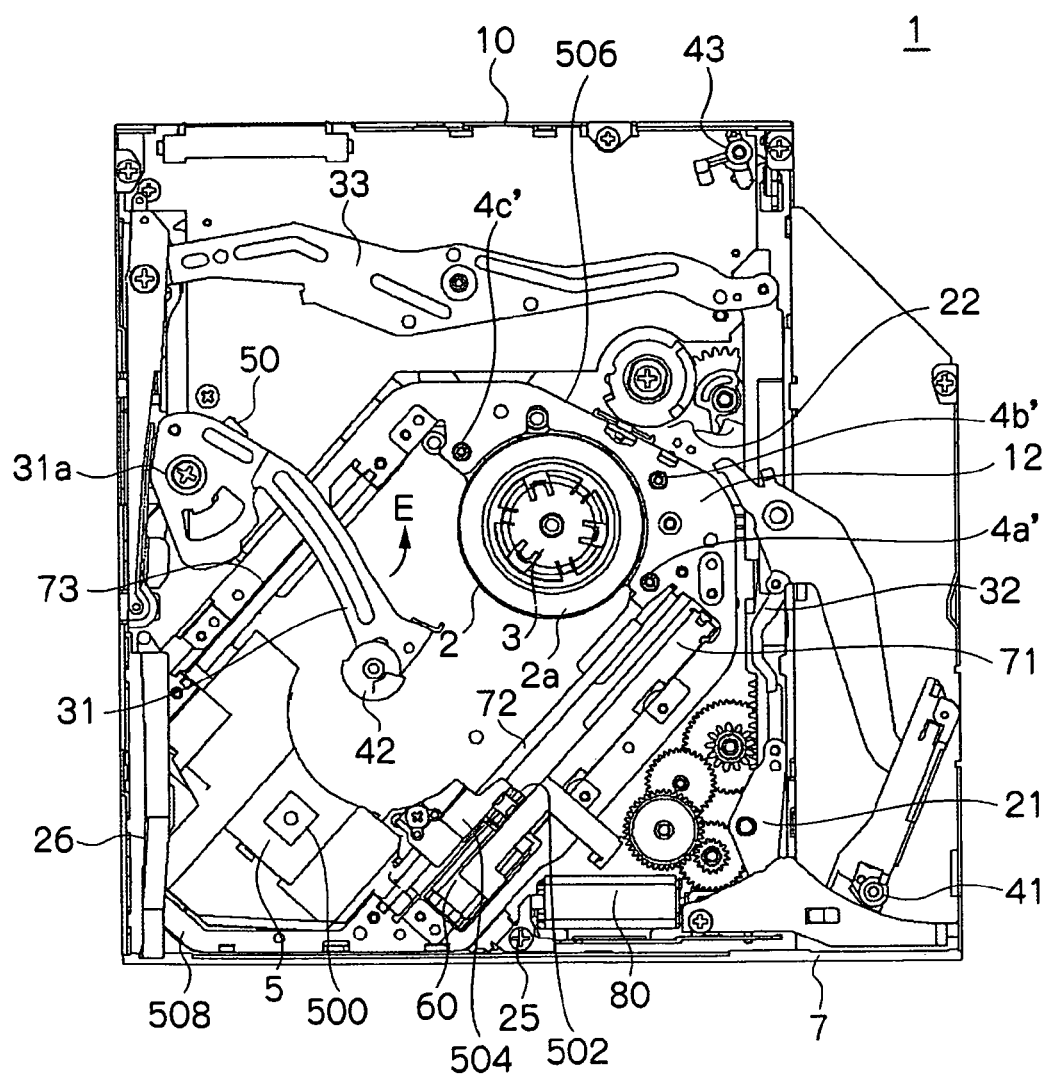
FIG. 1 is a plan view of the internal configuration of an optical disk device according to the first embodiment of the present invention.

The first embodiment of the invention will be described below. FIG. 1 is a plan view of an optical disk device of a slot-in system for directly inserting an optical disk into a package without using a disk tray. An optical disk device whose entire body thickness (the distance between the upper outside surface of the package and its lower outside surface) is $9.5 \times 10^{-3}$ m or less will be described as an example. Also, a top cover is omitted in FIG. 1 in order to clearly show the internal structure of the optical disk device.

A package for an optical disk device 1 is constructed by assembling a top cover with a bottom cover 10. A unit mechanical deck and other components are placed in the space formed by the top cover and the bottom cover assembled together. Most of these components are secured to the bottom cover 10.

Reference numeral 2 represents a disk motor 2 for rotating an optical disk (not shown in the drawing). This disk motor is generally located in the center of the bottom cover 10. On the disk motor 2, dampers 3 are located along a concentric circle with the disk motor 2. These dampers 3 protrude from the disk motor 2 toward the top cover and fit into a center hole in the optical disk, thereby chucking the optical disk to the disk motor 2. The disk motor 2 supports the optical disk on a disk plane support portion 2a so that the optical disk can rotate together with the disk motor 2.

An optical pickup 500 is secured to a slider 5. The slider 5 is a mobile mechanism for moving the optical pickup 500 back and forth along a radial direction of the optical disk. Reference numeral 12 represents a chassis made from a generally parallelogram frame. The disk motor 2 and the slider 5 are secured to this chassis 12 as described later in detail. The combination of the disk motor 2, the slider 5, and the chassis 12 is referred to as the "unit mechanical deck" as mentioned earlier.

The slider 5 is moved by: a lead screw shaft 71 with a thread groove formed therein; a chip 502 whose inside surface has a thread groove to engage with the thread groove of the lead screw shaft 71; and a small slider 504 connected to this chip 502. One end of the small slider 504 is secured to one of the slider 5. A motor 60 rotates the lead screw shaft 71. The rotation of the lead screw shaft 71 causes the chip 502 to move back and forth along the lead screw shaft 71. The same can be said about the small slider 504 including the chip 502. The slider 5 also moves back and forth along a radial direction of the optical disk in accordance with the small slider 504. Reference numerals 72 and 73 represent rod-shaped guides for guiding back-and-forth movements of the slider 5. Mobile mechanisms, such as the lead screw shaft 71, for the slider 5 are also secured to the chassis 12.

Levers 31, 32, 33 serve as power sources for the optical disk to insert the optical disk into or eject it from the package from the front side 7 of the package. The lever 31 rotates around a supporting point 31a. Rollers 41, 42, 43 come into contact with the outer periphery of the inserted optical disk and perform centering of the optical disk. A switch 50 turns on or off the supply of drive input to a motor 80. A transmission mechanism 21 transmits the rotational driving force of the motor 80 to the lever 32.

When the optical disk is directly inserted into the front side 7 of the package of the optical disk device 1 configured as described above, the rollers 41, 42, 43 come into contact with the outer periphery of the optical disk in that order, cause the levers 31, 32, 33 to shift their positions, perform centering of the optical disk, and position the optical disk so that its center axis will be located generally at the same position as the rotation axis of the disk motor 2.

When this happens, the roller 42 pushed by the outer periphery of the optical disk rotates the lever 31 in the direction indicated by arrow E around the supporting point 31a. If a rotation angle of the lever 31 in the arrow E direction reaches a specified value, the switch 50 is turned on. The transmission mechanism 21 includes a gear array. The roller 42 is placed on the lever 31.

When the switch 50 is turned on, the motor 80 starts rotating. As the motor 80 rotates, its rotational driving force is transmitted from the transmission mechanism 21 to the lever 32. The lever 32 then transmits the force to an elevating mechanism 22. A short shaft protrudes from the chassis 12 toward the elevating mechanism 22 and engages with an elevating member of the elevating mechanism. The elevating member of the elevating mechanism elevates the chassis 12 via the short shaft.

The elevating mechanism 22 elevates the top-end side 506 of the chassis 12 with reference to the base-end side 508 of the chassis 12, while the optical disk is inserted into a specified position in the package. The base-end side of the chassis 12 is secured at supporting points 25, 26 to the bottom cover 10. The top-end side of the chassis 12 is tilted toward the base-end side of the chassis 12 relative to the supporting points 25, 26. As a result, the chassis 12 becomes parallel to the bottom plate 10 and the optical disk engages with the dampers 3.

A pin 6 is exposed perpendicularly from a small-diameter hole in the chassis 12 near the disk motor 2. When the elevating mechanisms 22 lower the chassis 12 down toward the bottom plate 10, the pin 6 comes into slight contact with the optical disk and functions to remove the optical disk from the dampers 3.

When the chassis 12 is raised toward the optical disk, the dampers 3 of the disk motor 3 secured to the chassis 12 start to be inserted into the center hole in the optical disk, causing the disk plane support portion 2a to press the plane area of the optical disk around its center hole. As the top-end side 506 of the chassis 12 is further raised, the optical disk comes into contact with a recess in the top cover, then becomes held between the top cover and the disk plane support portion 2a, and is thereby almost completely chucked by the dampers 3.

Figure 2:
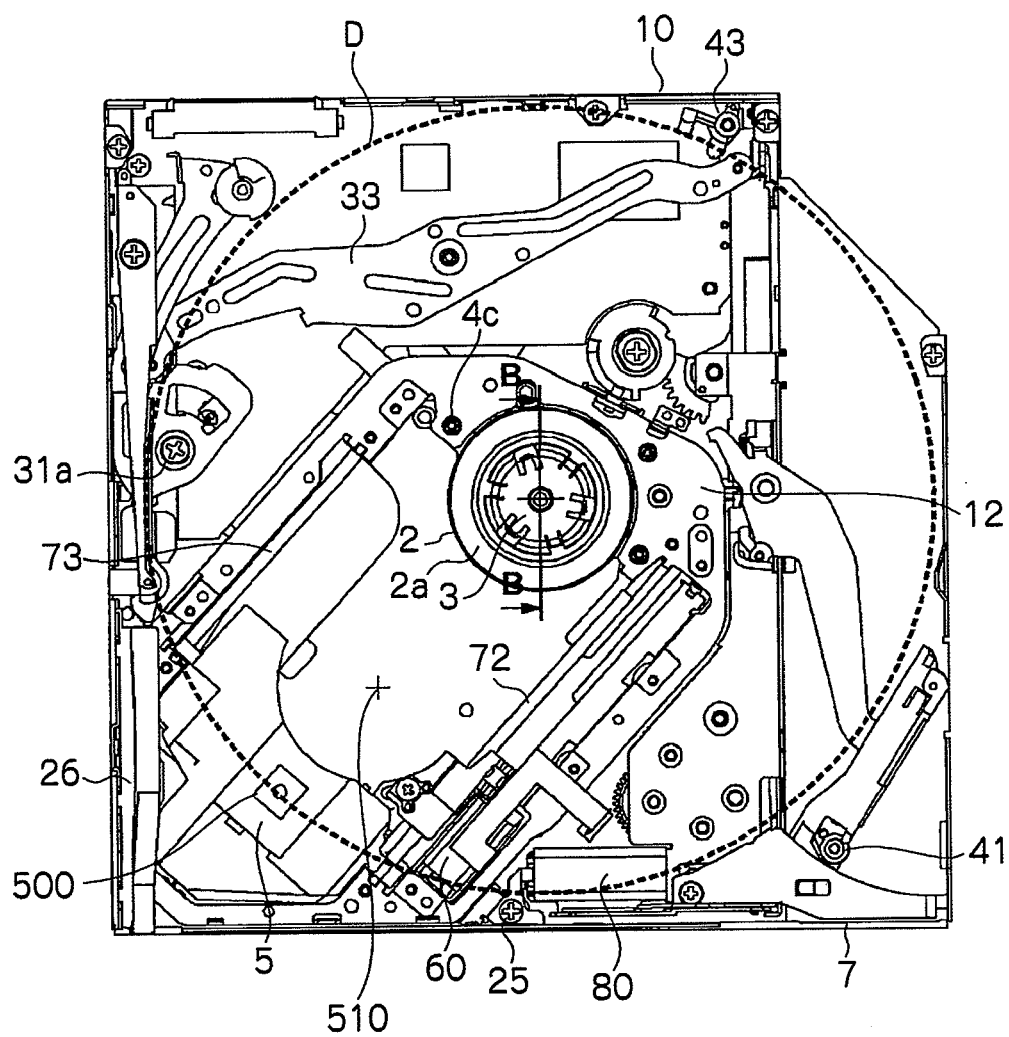
FIG. 2 is a plan view of the optical disk device according to the first embodiment in which an optical disk is placed.
Figure 3:
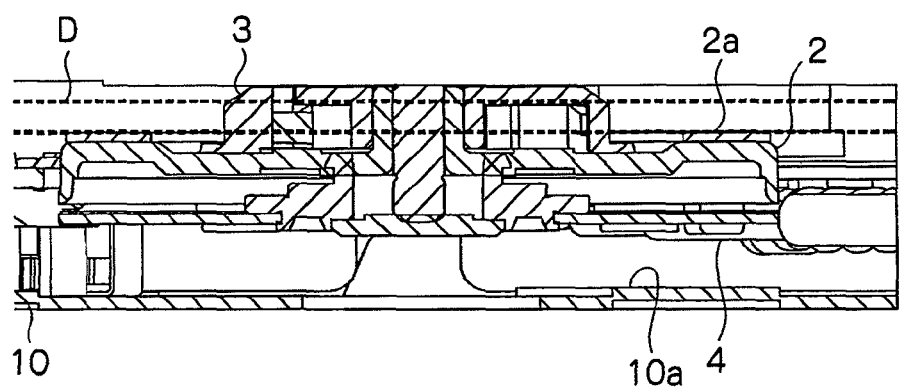
FIG. 3 is a cross-sectional view of the optical disk device as taken along line B-B in FIG. 2.

FIG. 2 shows the state where the optical disk D is chucked on the disk motor secured to the chassis 12. In this state, the optical pickup 500 faces the recording surface of the optical disk. The slider 5 including the optical pickup 500 moves back and forth along a radial direction of the optical disk D in the internal space of the chassis 12 (see FIG. 3) between the recording surface of the optical disk D and the bottom case 10. FIG. 3 is a cross-sectional view of the optical disk device 1 as taken along line B-B in FIG. 2 and shows the state where the optical disk D is chucked by the dampers 3. Reference numeral 4 represents a disk motor plate for securing the disk motor 2 to the chassis 12, and reference numeral 10a represents a raised portion that is a buffer mechanism. Both of them will be described later in detail. The disk motor plate 4 and the chassis 12 are composed of thin metal plates. When the step of chucking the optical disk to the disk motor is completed, the disk motor 2 rotates the optical disk and the optical pickup 5 records or reads information on or from the optical disk.

Figure 4:
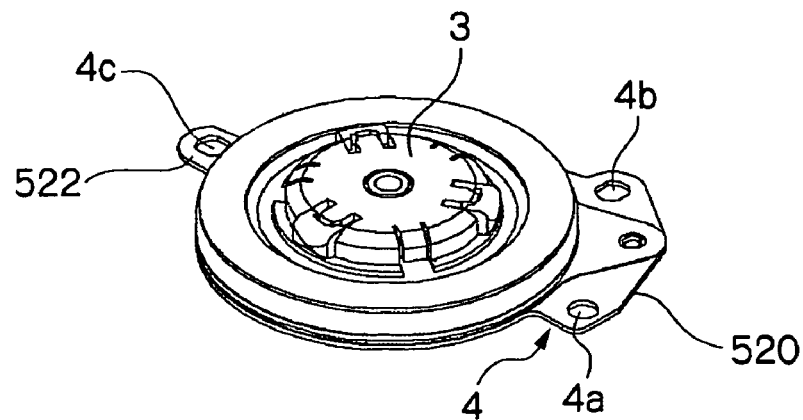
FIG. 4 is a perspective view of a disk motor and a disk motor plate.
Figure 5:
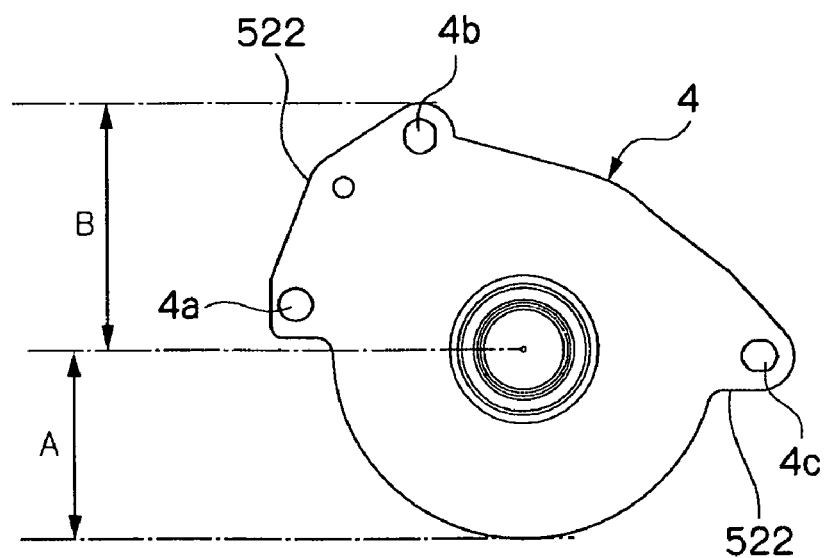
FIG. 5 is a back view of the disk motor plate.

FIG. 4 is a perspective view of the disk motor 2 and the disk motor plate 4 for securing the disk motor 2 to the chassis 12. The disk motor plate 4 is secured to an end face of the disk motor 2 opposite the bottom plate 10. FIG. 5 is a back view of the disk motor plate 4. The optical pickup 500 side of the disk motor plate 4 (area A in FIG. 5) is of a semicircular shape having a diameter generally equal to that of the disk motor, and the other side of the disk motor plate 4 (area B in FIG. 5) opposite the optical pickup 500 is of a non-semicircular shape. As shown in FIG. 4, the non-semicircular area of the disk motor plate (area B in FIG. 5) has a first flange 520 and a second flange 522 protruding from the circular edge line of the disk motor 2. These flanges have screw holes 4a, 4b, 4c. The non-semicircular area of the disk motor plate (area B in FIG. 5) can be secured to the chassis 12 by placing the flanges of the disk motor plate 4 on the back face of the chassis 12, inserting screws into the screw holes, and making them engage with each other. Referring to FIG. 1, 4a' represents a screw hole formed in the chassis 12 that corresponds to the screw hole 4a in the disk motor plate; similarly, 4b' represents a screw hole corresponding to the screw hole 4b, and 4c' represents a screw hole corresponding to the screw hole 4c. Screws are inserted into and engage with these screw holes, thereby securing the disk motor plate 4 to the chassis 12 as described above.

As shown in FIG. 1, the screw hole 4a' and the screw hole 4b' are made in the chassis 12 on the right side in the drawing and are located slightly close to each other. On the other hand, the screw hole 4c' is made in the chassis 12 on the left side in the drawing and is separated from the screw hole 4a' and the screw hole 4b'. These screw holes cannot be located at equally spaced positions in the chassis 12 because the pin 6 should be skirted when making the screw holes.

As shown in FIG. 4, one side of the disk motor plate 4 (area B in FIG. 5) where the optical pickup is not located is secured to the chassis 12, while the optical pickup side of the disk motor plate 4 (area A in FIG. 5) is not secured to the chassis and is suspended above the bottom plate 10. If the disk motor plate experiences a falling impact as described above, a moment is produced on the unsecured side (area A in FIG. 5) of the disk motor plate, using the aforementioned screw holes 4a, 4b, 4c as the supporting points. As a result, there is a possibility that the unsecured side of the disk motor plate may be plastically deformed.

Figure 6:
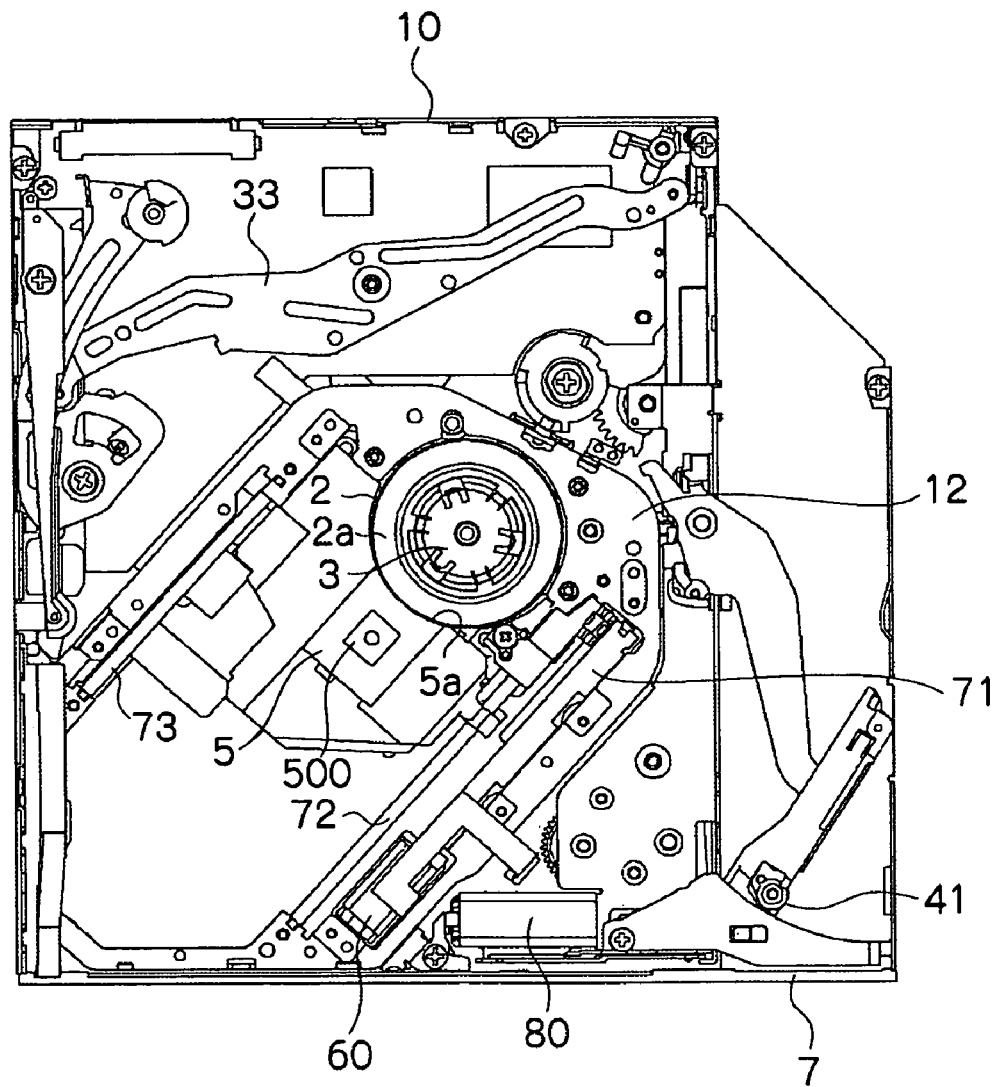
FIG. 6 is a plan view of the optical disk device according to the first embodiment where the optical pickup is located closest to the disk motor.

As shown in FIG. 6, the optical disk device 1 is originally designed to allow the slider 5 to move closer to and be located right next to the disk motor 2 so that the optical pickup 500 can utilize a wider area of the recording and reproduction surface of the optical disk. Therefore, the aforementioned flanges (see FIGS. 4 and 5) cannot be provided on the optical pickup 500 side of the disk motor plate 4. As shown in FIG. 6, the top end 5a of the slider 5 that moves toward the disk motor 2 is cut in a circular shape that corresponds to the circular shape of the disk motor 2. The optical pickup 500 can be moved closer to the disk motor 2 by having the outer periphery of the disk motor 2 fit in the above-described circular recess 5a.

Figure 7:
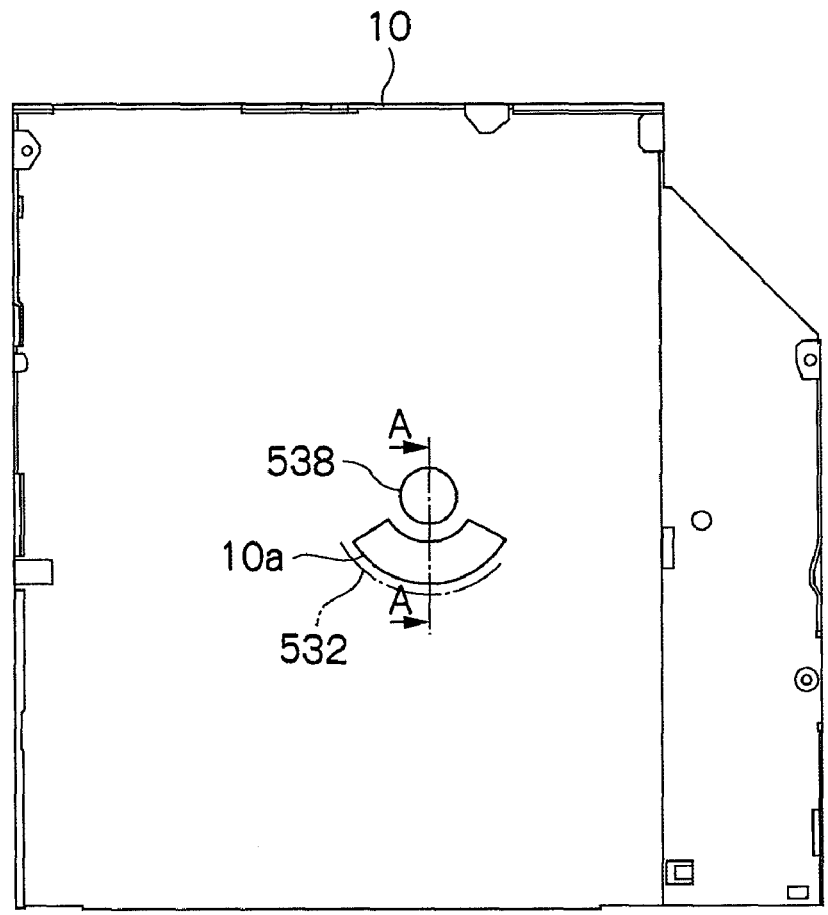
FIG. 7 is a back view of a bottom cover that constitutes a package for the optical disk device.
Figure 8:
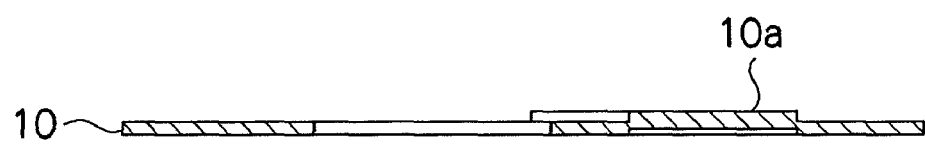
FIG. 8 is a cross-sectional view of the bottom cover as taken along line A-A in FIG. 7.

Next, the raised portion (10a in FIG. 2) serving as the buffer mechanism mentioned above will be described below in detail. FIG. 7 is a plan view of the aforementioned bottom cover 10. FIG. 8 is a cross-sectional view of the bottom cover 10 as taken along line A-A. Reference numeral 538 represents an opening to receive a coil for the disk motor 2, and reference numeral 10a represents a fan-shaped, raised portion protruding toward the upper cover. This raised portion is located in a projection plane of the disk motor 2 and the disk motor plate 4, that is formed on the bottom cover 10, and in the area of the optical pickup side of the disk motor plate (area A in FIG. 5). Reference numeral 532 represents the edge line of the projection plane.

Figure 10:
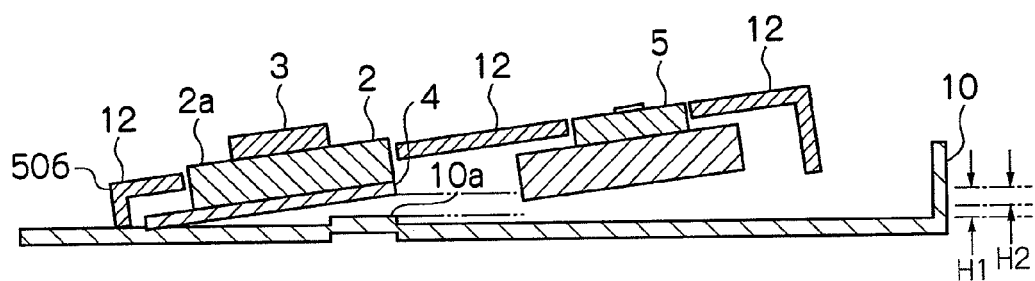
FIG. 10 is a cross-sectional view of the unit mechanical deck and the bottom cover, showing the effect of a buffer mechanism (a raised portion).

If there is no raised portion 10a as shown in FIG. 10 (described later), the distance between the lower end face of the disk motor plate 4 and the bottom cover 10 is H1. On the other hand, if there is a raised portion 10a, the distance between the lower end face of the disk motor plate 4 and the bottom cover 10 is H2 (H2<H1).

Even if the disk motor plate 4 receives an impact and the disk motor plate 4 is elastically deformed, the amount of deformation will be reduced and limited to the range of H1 to H2. As a result, it is possible to avoid the disk motor plate 4 being deformed plastically beyond a limit point at which the disk motor plate 4 can suffer elastic deformation. When assembling the chassis 12 to which the disk motor 2 and other components are secured, with the bottom cover, a certain amount of gap between the disk motor plate 4 and the bottom cover 10 should be allowed because component tolerance needs to be permitted in order to ensure the freedom in design and assembly to a certain degree. The part of the disk motor plate 4 near the area where it is secured to the chassis 12 tends to be plastically deformed.

The raised portion 10a shown in FIGS. 7 and 8 can be easily formed on the bottom cover by means of drawing, i.e., putting and pressurizing the bottom cover in a die. If the distance between the bottom cover 10 and the disk motor plate 4 is approximately 1 mm, the size of the raised portion 10a, i.e., the height of the raised portion 10a in the thickness direction of the optical disk, is approximately from 0.5 mm to 0.8 mm. The thickness of the raised portion may be designed arbitrarily from the viewpoint of the above-mentioned freedom in manufacture and designing and in consideration of a balance with respect to reduction of the amount of deformation of the disk motor plate.

The shape of this raised portion 10a has been described above as a fan-like shape as seen from above; however, the shape of the raised portion 10a is not limited to this example, and may be circular or rectangular. Also, if the diameter of the circular area (area A in FIG. 5) of the disk motor plate 4 is smaller than that of the disk motor, the raised portion may be provided in a projection plane of the disk motor. This is because the elastic deformation amount of the disk motor plate can be reduced by suppressing the inclination of the disk motor.

Figure 9:
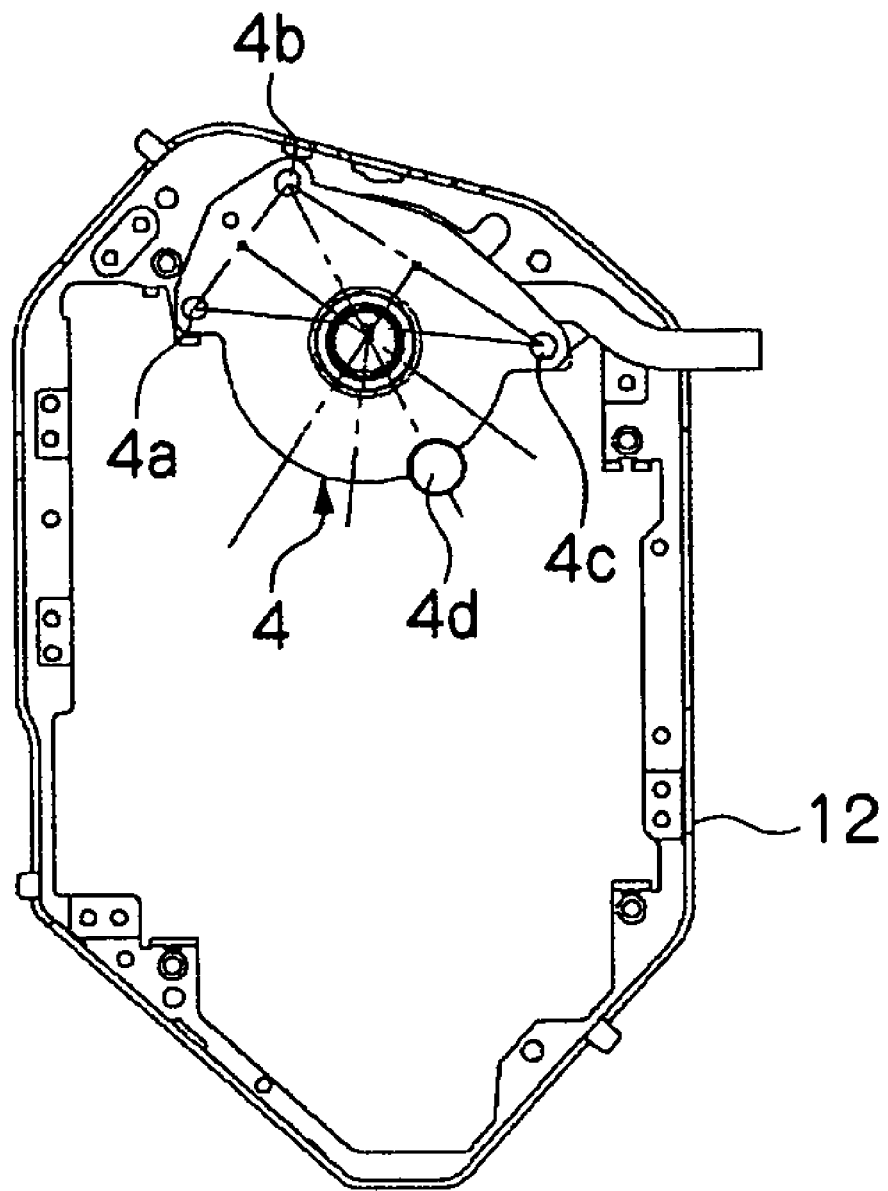
FIG. 9 is a back view of a chassis for a unit mechanical deck.

FIG. 9 is a back view of the chassis 12, showing another shape of the raised portion. FIG. 9 shows that the disk motor plate 4 is supported in a cantilever-like manner by the back face of the chassis 12. The screw holes 4a, 4b, 4c for securing the disk motor plate to the chassis are not equally spaced as described above. As a result, the support is not sufficient in the area of the disk motor plate (area B in FIG. 5) which is not the optical pickup side, and the degree of elastic deformation of the optical pickup side of the disk motor plate (area A in FIG. 5) will increase accordingly. Therefore, a means is devised to decide a position (4d) on the bottom cover where the raised portion should be provided.

Of the three screw holes 4a, 4b, 4c for supporting the disk motor 2, the screw holes 4a and 4c are located at symmetric positions at opposite ends of a diagonal line passing through the rotation center of the disk motor. As a result, a relation is established between the screw hole 4a and the screw hole 4c so that deformation of the disk motor plate 4 around the screw hole 4a and deformation of the disk motor plate 4 around the screw hole 4c buffer each other. On the other hand, no screw hole is made at the end of a diagonal line passing through the rotation center of the disk motor plate opposite the screw hole 4b. Therefore, a raised portion is located at the position indicated as 4d at the opposite end of the diagonal line in a boundary area of the projection plane of the disk motor plate. As a result, even if the disk motor plate around the screw hole 4b is elastically deformed, the raised portion can buffer that elastic deformation.

Figure 11:
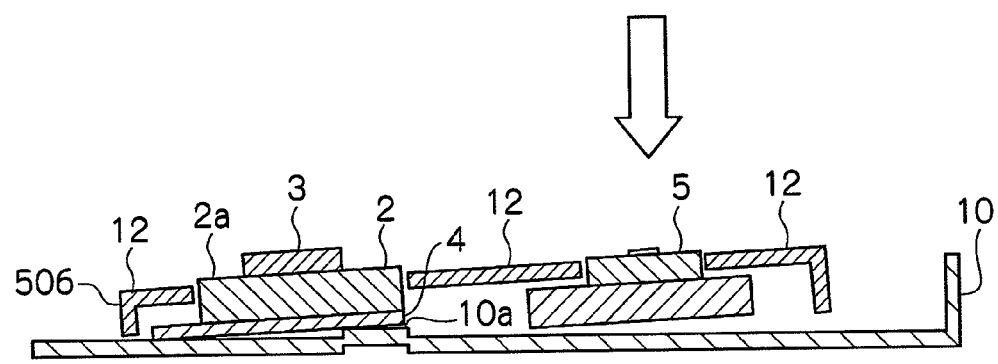
FIG. 11 is a cross-sectional view of the unit mechanical deck and the bottom cover, showing the effect of the buffer mechanism (the raised portion).

FIGS. 10 and 11 are cross-sectional views of a unit mechanical deck for explaining the function of the raised portion 10a. FIG. 10 shows a stand-by state where the optical disk is not chucked to the disk motor 2. If the unit mechanical deck in the above-described state experiences an impact in a direction perpendicular to the bottom cover 10, i.e., the direction indicated with an arrow in FIG. 11, since the top end 506 of the chassis 12 is secured by the elevating mechanism 22 in FIG. 1 to the lowest end position and the chassis 12 is thereby inclined toward the bottom cover 10 as shown in FIG. 11, stress due to this impact will be generated rapidly as a rotation moment to rotate the disk motor plate 4, which has lower rigidity than that of the chassis, around a joint part between the disk motor plate 4 and the chassis 12.

However, the raised portion 10a comes into contact with the elastically deformed disk motor plate 4 as shown in FIG. 11 and suppresses further elastic deformation of the disk motor plate 4.

On the other hand, if this raised portion does not exist, and if the disk motor plate 4 is considerably deformed elastically and the disk motor plate 4 experiences drastic and excessive impact stress, the disk motor plate 4 may be eventually plastically deformed. The resulting problems are that the optical disk can no longer be secured to the disk motor and maintain good parallelism with the optical pickup as shown in FIG. 2, and that the optical pickup will experience a failure in the control action when writing or reading information to or from the optical disk. Such an impact is frequently caused when, for example, equipment containing an optical disk drive falls from a high position down to a hard floor surface.

Second Embodiment

Figure 12:
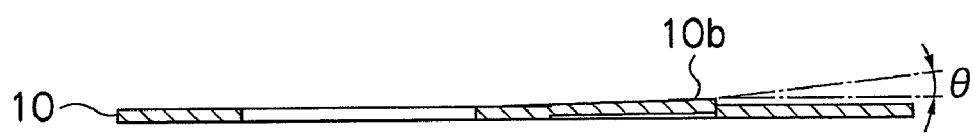
FIG. 12 is a cross-sectional view of a bottom cover with a raised portion having another configuration.

The second embodiment of the present invention will be described below. The second embodiment is characterized in that the cross-sectional shape of a raised portion (described above) formed on a bottom cover 10 is different from that in the aforementioned embodiment. FIG. 12 is a cross-sectional view showing the shape of a raised portion 10b formed on a bottom cover 10 according to the second embodiment. FIG. 12 corresponds to a cross-sectional view of the bottom cover 10 as taken along line A-A in FIG. 7.

As shown in FIG. 12, the raised portion 10b is inclined toward the bottom cover 10. Letter "θ" in FIG. 12 represents an angle formed by an extension line (alternating long and short dashed line) from the edge line of the raised portion 10b and an extension line (alternating long and short dashed line) from the edge line of the bottom cover 10. In other words, the raised portion 10b has an inclined surface at this angle θ.

If the chassis experiences an impact, the disk motor plate around its joint part with the chassis bends toward the bottom cover. When this happens, the disk motor plate comes into contact with the inclined surface of the raised portion. The inclined surface of the raised portion is formed so that it corresponds to the inclined shape of the disk motor plate. As a result, the disk motor plate can be supported by almost the entire inclined surface of the raised portion 10b. Therefore, the effect of buffering impact on the disk motor plate can be enhanced.

Third Embodiment

Figure 13:
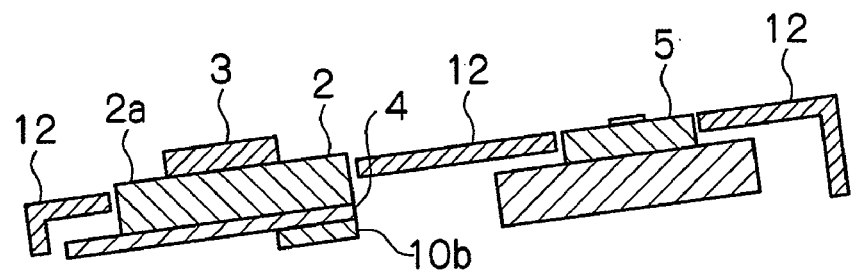
FIG. 13 is a cross-sectional view of the unit mechanical deck, showing the shape of an elastic member that is a buffer mechanism.

The third embodiment of the present invention will be described below. The third embodiment is characterized in that an elastic member is used, instead of the raised portion described above, to realize the buffer mechanism. As shown in FIG. 13, this elastic member 100,101 can be bonded to the bottom cover 10 side of the disk motor plate 4. Alternatively, the elastic member 100,101 may be bonded to the bottom face of the bottom cover 10. Examples of the material for the elastic member 100,101 include a cushion, a plastic plate, and a rubber damper.

Figure 14A:
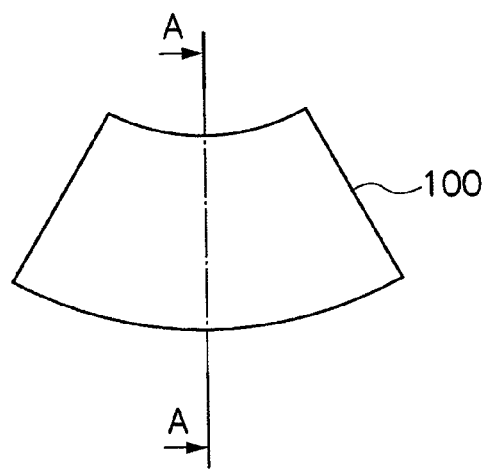
FIG. 14A is a plan view showing the shape of an elastic member.
Figure 14B:
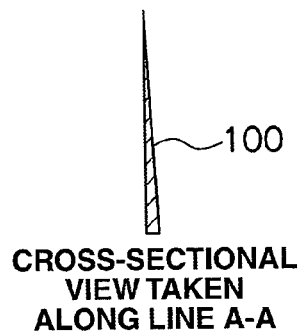
FIG. 14B is a cross-sectional view of the elastic member as taken along line A-A in FIG. 14A.

FIGS. 14 and 15 are drawings explaining the elastic member. FIG. 14A is a plan view of an elastic member 100, and FIG. 14B is a cross-sectional view of the elastic member 100 as taken along line A-A in FIG. 14A. The elastic member 100 is of a fan-like shape as shown in FIG. 14A and has a triangular cross-section as shown in FIG. 14B.

Figure 15A:
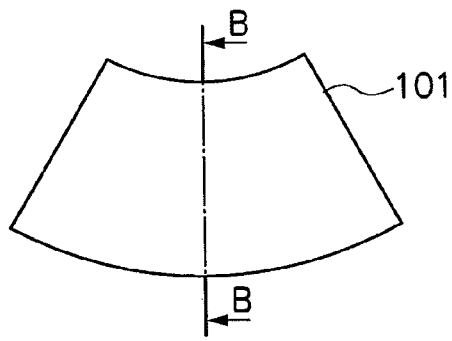
FIG. 15A is a plan view showing another shape of an elastic member.
Figure 15B:
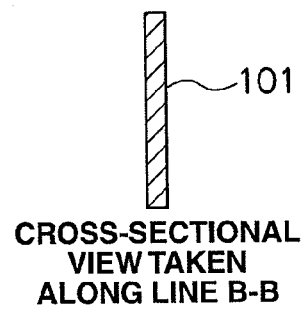
FIG. 15B is a cross-sectional view of the elastic member as taken along line B-B in FIG. 15A.

FIG. 15A is a plan view of an elastic member 101 and FIG. 15B is a cross-sectional view of the elastic member 101 as taken along line B-B in FIG. 15A. The elastic member 101 is of a fan-like shape as seen from above in FIG. 15A and has a rectangular cross-section as shown in FIG. 15B.

The thickness of these elastic members 100 and 101 is set to a value obtained by adding approximately 0.3 mm to the clearance (the largest distance) between the bottom cover 10 and the disk motor plate 4 in order to realize a sufficient impact buffering action. For example, if the clearance between the bottom cover 10 and the disk motor plate 4 is 0.9 mm, the thickness of the elastic member 100 or 101 is set to 1.2 mm. As a result, the elastic member 100, 101 can flexibly suppress elastic deformation of the disk motor plate 4.

The invention according to the first to third embodiments described above can provide an optical disk device having excellent impact resistance.

The aforementioned embodiments described the optical disk device in a slot-in system, but the present invention can be also applied to an optical disk device in a tray system. Also, the aforementioned embodiments described the case where the entire body thickness of the optical disk device (the distance between the outside upper surface and the outside lower surface of the package) is $9.5 \times 10^{-3}$ m or less, but this is just an example and the thickness of the optical disk device is not limited to this example. Any other change that can be predicted by those skilled in the art can be made to the aforementioned embodiments.

The above-described embodiments enable prevention of plastic deformation of the support mechanism for the disk motor for rotating an optical disk due to, for example, an impact to the support mechanism and any resulting damage to the degree of parallelism of the optical disk in relation to the optical pickup.

What is claimed is:
1. An optical disk device comprising:
a package to insert the optical disk into;
a disk motor for rotating the optical disk inserted into the package;
an optical pickup that moves in a radial direction of an optical disk, for controlling recording information on the optical disk or reading information from the optical disk;

a base for supporting the disk motor and the optical pickup to chuck the optical disk inserted into the package to the disk motor;

a disk motor plate for securing the disk motor to the base, the disk motor plate having, on its one side where the optical pickup is not located, a flange extending from the disk motor toward the base, the flange being secured to the base and the optical pickup side of the disk motor plate being not secured to the base; and a buffer mechanism, configured to reduce the distance between a lower end face of the disk motor plate and a bottom face of the package to thereby avoid the disk motor plate being deformed plastically beyond a limit point at which the disk motor plate can suffer elastic deformation during the disk motor plate receiving an impact, for buffering elastic deformation of the optical pickup side of the disk motor plate;

wherein the buffer mechanism is located in a projection plane of the optical pickup side of the disk motor plate on a bottom face of the package, and wherein the buffer mechanism is composed of a raised portion made by drawing the bottom face of the package so that the raised portion protrudes toward the disk motor plate, wherein when the optical disk is in a standby state where it is not chucked to the disk motor, the disk motor plate is inclined toward the bottom face of the package and secured to the base and the raised portion is of an inclined shape that corresponds to the inclination of the disk motor plate.

2. The optical disk device according to claim 1, wherein the buffer mechanism is located in a projection plane of the optical pickup side of the disk motor on a bottom face of the package.

3. The optical disk device according to claim 1, wherein the buffer mechanism is an elastic member placed between the bottom face of the package and the disk motor plate.

4. The optical disk device according to claim 1, wherein a slot-in system is employed as a method for inserting the optical disk into the package.

5. The optical disk device according to claim 1, wherein the distance between the upper outside surface of the package and the lower outside surface thereof is $9.5 \times 10^{-3}$ m or less.

* * * * *